(12) United States Patent
Berlinger, Jr. et al.

(10) Patent No.: US 10,232,701 B2
(45) Date of Patent: Mar. 19, 2019

(54) DRIVE FOR AUTONOMOUS GUIDED VEHICLE

(71) Applicant: ASI Technologies, Inc., Montgomeryville, PA (US)

(72) Inventors: Bernard E. Berlinger, Jr., Montgomeryville, PA (US); John Cross, Montgomeryville, PA (US)

(73) Assignee: ASI Technologies, Inc., Montgomeryville, PA (US)

( * ) Notice: Subject to any disclaimer, the term of this patent is extended or adjusted under 35 U.S.C. 154(b) by 4 days.

(21) Appl. No.: 15/427,556

(22) Filed: Feb. 8, 2017

(65) Prior Publication Data

US 2018/0222310 A1    Aug. 9, 2018

(51) Int. Cl.
| | |
|---|---|
| *B62D 51/00* | (2006.01) |
| *B62D 51/04* | (2006.01) |
| *B60K 17/30* | (2006.01) |
| *E02F 3/60* | (2006.01) |
| *B60K 7/00* | (2006.01) |
| *B60K 1/02* | (2006.01) |
| *B60K 17/04* | (2006.01) |
| *F16H 57/021* | (2012.01) |
| *G05D 1/02* | (2006.01) |
| *F16H 57/02* | (2012.01) |
| *F16H 1/08* | (2006.01) |

(52) U.S. Cl.
CPC .............. *B60K 7/0007* (2013.01); *B60K 1/02* (2013.01); *B60K 17/043* (2013.01); *F16H 57/021* (2013.01); *G05D 1/021* (2013.01); *B60K 2007/0061* (2013.01); *F16H 1/08* (2013.01); *F16H 2057/02034* (2013.01)

(58) Field of Classification Search
CPC ........ B62D 51/00; B62D 51/04; B60K 17/30; E02F 3/60
See application file for complete search history.

(56) References Cited

U.S. PATENT DOCUMENTS

| | | | |
|---|---|---|---|
| 3,247,736 A | 4/1966 | Karlheinz | |
| 5,094,310 A * | 3/1992 | Richey | ................... A61G 5/045 180/6.5 |
| 8,280,546 B2 | 10/2012 | D'Andrea et al. | |
| 8,918,202 B2 * | 12/2014 | Kawano | ............... G05D 1/0234 700/213 |
| 9,127,763 B2 | 9/2015 | Tryens et al. | |
| 2007/0007055 A1 * | 1/2007 | Schmidt | ................... F16H 1/20 180/65.235 |
| 2014/0033862 A1 * | 2/2014 | Tryens | ................ F16H 57/0464 74/606 R |

* cited by examiner

*Primary Examiner* — Bryan A Evans
(74) *Attorney, Agent, or Firm* — Baker & Hostetler LLP

(57) ABSTRACT

An autonomous guided vehicle includes a drive having a high power density, a high sustainable wheel load density, and sufficient moment of inertia. The drive includes a single pass gear set, a preload system for roller bearings, a flywheel, an integral motor, and encoders.

19 Claims, 9 Drawing Sheets

DRIVE FOR AUTONOMOUS GUIDED VEHICLE

BACKGROUND

Autonomous guided vehicles, such as material handling robots, are widely used in many applications. As explained in U.S. Pat. No. 8,280,546, a prior art mobile drive unit for an inventory system includes a docking head, a drive module, a docking actuator, and a control module. Additionally, the mobile drive unit may include one or more sensors configured to detect or determine the position or location of the mobile drive unit and one or more sensor for determining whether the drive unit is engaged or docked with the inventory system.

The drive module propels the mobile drive unit and, when engaged with the drive module, also propels the inventory system. Conventional drive modules include a drive assembly that includes or couples to an axle, a pair of opposing, motorized or driven wheels on the axle, and a pair of front stabilizing wheels and a pair of rear stabilizing wheels. The drive module also includes rechargeable batteries for powering the drive assembly. Preferably, the maximum velocity of a robot is approximately 1.3 meters per second.

A popular drive assembly includes a brushless motor and integrated gears, as described in U.S. Pat. No. 9,127,763, entitled "Motor Housing With Integrated Gears." The drive assembly of the 763 patent includes a brushless motor, a motor shaft coupled to the rotor of the motor, a motor shaft pinion, also referred to as a first pinion, formed on the motor shaft, a parallel gear set, and an output shaft. The parallel gear set includes (i) an intermediate gear, also referred to as a first gear, that is engaged with the motor shaft pinion, (ii) an intermediate pinion, also referred to as a second pinion, coupled to the first gear by a common shaft, and (iii) an output shaft gear that is engaged with the intermediate pinion and coupled to the output shaft.

An aspect of a prior art drive assembly is the ability to monitor position or rotation of the shafts. Typically, encoders (such as an incremental encoder, an absolute encoder, or both) are positioned to determine the position and/or the magnitude of rotation of the motor shaft and the output shaft. Information from the encoders is fed to a control system. Overall drive system function sometimes requires a minimum moment of inertia.

SUMMARY

The drive assemblies of autonomous guided vehicles (AGVs)—such as material handling robots, mobile robotic fulfillment systems, automated storage and retrieval systems, and many others—have numerous design parameters, including radial load (that is, vertical load on the output shaft transmitted to the wheel), power output, power density (that is, the power output of the drive per volume of the drive assembly), and the like.

Improving an AGV drive assembly to increase its power density is a technical hurdle. Moreover, upon improving the drive unit's power density by improving the rotating parts of the drive assembly (that is, the motor rotor, output shaft, bearings, and gearing), and thereby decreasing the weight the rotating parts, the inventors found that the rotating parts can have insufficient inertia for proper functioning of the drive.

Accordingly, according to an aspect of one embodiment of the invention, the drive assembly includes single pass, helical gear set. According to another aspect, the drive assembly includes a flywheel, even though adding to the overall moment of inertia of the drive assembly is contrary to the conventional goal for AGV drives to reduce weight. Further, it is believed that the single pass gear set in combination with pre-loaded taper roller bearings provide an improved power density at the output shaft.

In this regard, an autonomous guided vehicle, such as a material handling robot, is provided having at least left and right drive assemblies. Each one of the drive assemblies is adapted for mounting to corresponding left and right drive wheels. Each drive assembly includes a housing, an output shaft, a gear set, a motor rotor, a motor stator, a flywheel, and an encoder. The output shaft extends through a sidewall of the housing and is coupled to its corresponding wheel. The gear set imparts torque to the wheel to cause rotation of the wheel.

The gear set consists of a helical gear coupled to the output shaft and a helical pinion engaged with the helical gear. The motor rotor is coupled to the pinion and the motor stator is fixed in the housing. The flywheel preferably is coupled to the gear set such that the flywheel rotates with a component of the gear set. The encoder is coupled to one of the motor rotor, pinion, and output shaft. The rotor, the stator, the flywheel, and the gear set are within the housing. The output shaft protrudes through the housing to enable mounting to the wheel.

Preferably, each one of the drive assemblies is symmetric about a horizontal centerline, such that the left drive assembly is identical to the right drive assembly. The left drive assembly is oriented 180 degrees from the right drive assembly about an axis perpendicular to a center axis of the output shafts. In this regard, only one configuration needs to be manufactured and stocked, as a single configuration of the drive assembly can be oriented one way to be the left drive assembly and oppositely oriented to be the right drive assembly.

Preferably, the moment of inertia of the flywheel is at least $0.008$ $kg*m^2$ and no more than $0.500$ $kg*m^2$, more preferably at least $0.012$ $kg*m^2$ and no more than $0.400$ $kg*m^2$, and in the embodiment shown at least $0.013$ $kg*m^2$ and no more than $0.250$ $kg*m^2$.

Preferably, the rated sustainable wheel load density, measured by the sustaining wheel load radial rating divided by the weight of the drive assembly is at least 250 N/KG, more preferably is at least 350 N/KG, and even more preferably is at least 450 N/KG. The preferred rated radial load on each wheel is at least 800 pounds (365 kg) and no more than 2,000 pounds (900 kg).

Preferably, the AGV is capable of moving at least 1.5 miles per hour and no more than about 6 miles per hour, and more preferably at least 3.0 miles per hour and no more than 4.0 miles per hour. The preferred wheel is 4 inches to 8 inches in diameter.

According to another aspect of the present invention, a drive assembly for an autonomous guided vehicle includes a housing, a motor, an output shaft, a gear mounted on the output shaft, a pair of tapered roller bearings, and a compression plug, which preferably is ring-shaped. The output shaft is operatively coupled to the motor and extends through the housing such that a wheel can be mounted to the output shaft.

The gear is mounted to the output shaft and includes peripheral teeth and a side face. The term "mounted to" refers to any means, including being formed integrally. The pair of tapered roller bearings is located within the housing and supports the output shaft. A front one of the pair of tapered roller bearings has a cone in contact with a front contact surface of the output shaft. A rear one of the pair of tapered roller bearings has a cone in contact with an internal contact surface of the housing and a cup in contact with a rear contact surface, which may be formed on the output shaft or a portion of the gear set. Where the gear set includes a single helical gear, the rear contact surface may at least partially be formed on a side face of the helical output gear.

The compression ring or plug, upon tightening, contacts a cup of the front bearing to preload the front bearing against the output shaft front contact surface and to preload the rear bearing against the housing internal contact surface. Preferably, the front contact surface of the output shaft is a shoulder formed on the output shaft, and the rear contact surface of the output shaft is a portion of the output gear side face. The compression ring or plug is adapted for installation within a specified torque range to achieve a desired preloading force of the front bearing and the rear bearing. The compression ring or plug preferably is locked into place.

DETAILED DESCRIPTION OF ILLUSTRATIVE EMBODIMENTS

Figure 1:
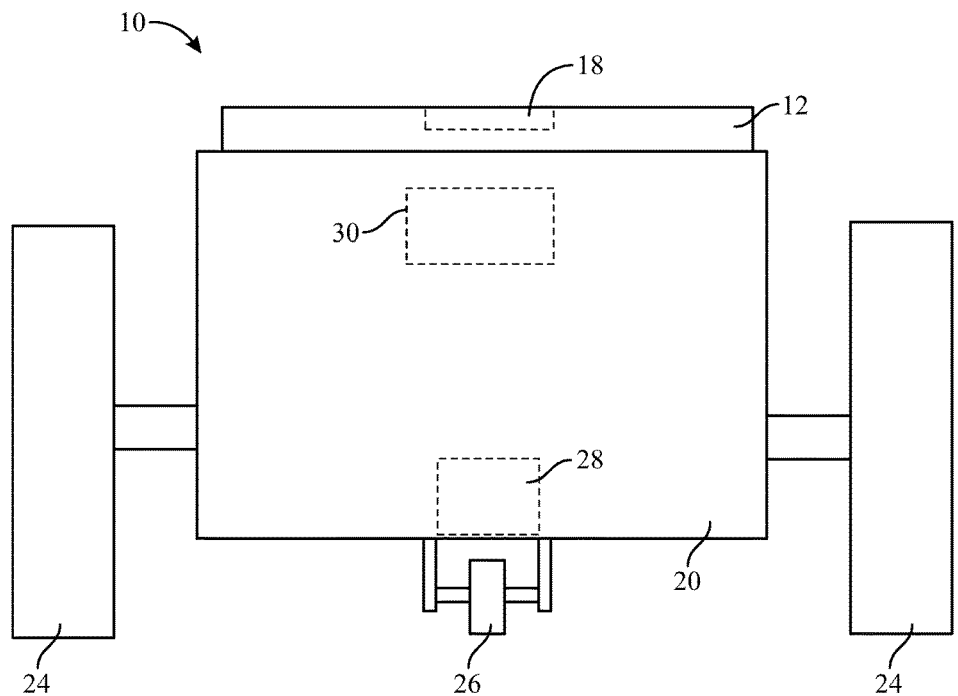
FIG. 1 is a schematic front view of an autonomous guided vehicle according to an aspect of an embodiment of the present invention.
Figure 2:
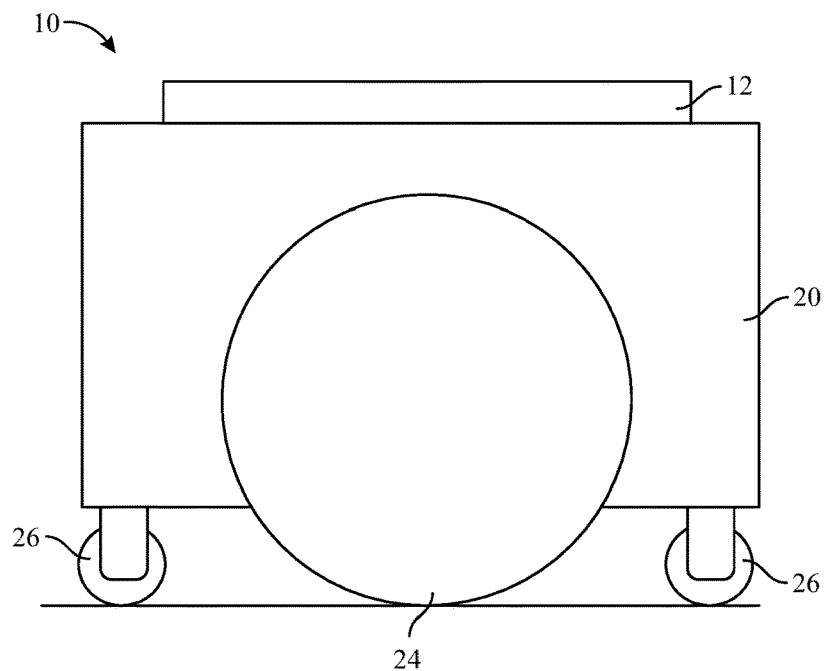
FIG. 2 is a schematic side view of the embodiment of FIG. 1.

A material handling robot 10, illustrated schematically in FIGS. 1 and 2, includes a docking system, such as docking head 12, a mobile drive unit 20, and a control unit 30. The docking system is the type that is intended to interface with a shelf unit or inventory system as described in U.S. Pat. No. 8,280,546, the description of the components and uses of which are incorporated herein by reference. Docking head 12 includes a docketing actuator (not shown in the figures) and a holder sensor 18. Docking head 12 is the type for engaging, lifting, and transporting an inventory system or inventory holder, as will be familiar by persons familiar with material handling robots.

Figure 3:
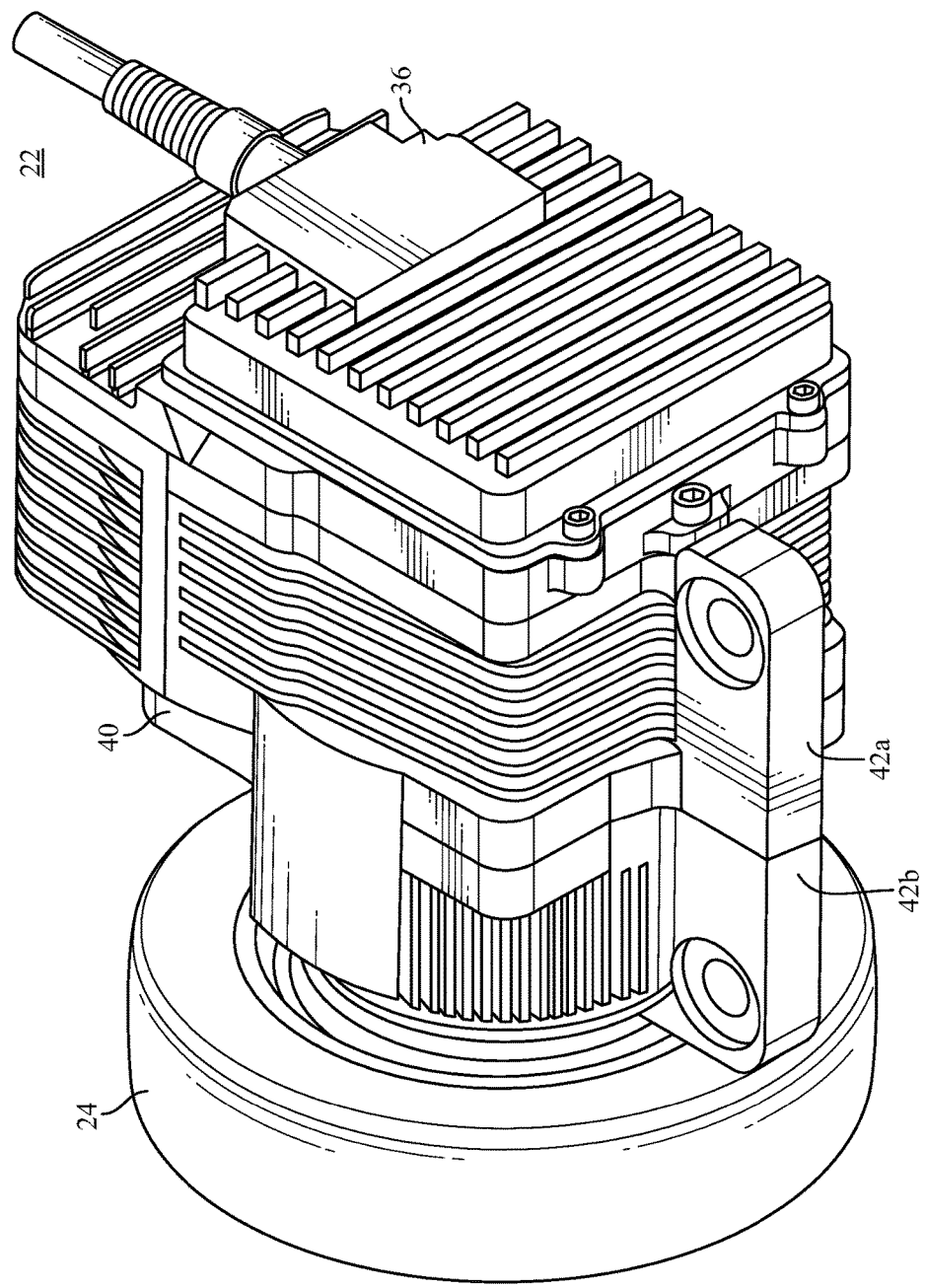
FIG. 3 is a first perspective view of a drive assembly of the embodiment of FIG. 1.
Figure 4:
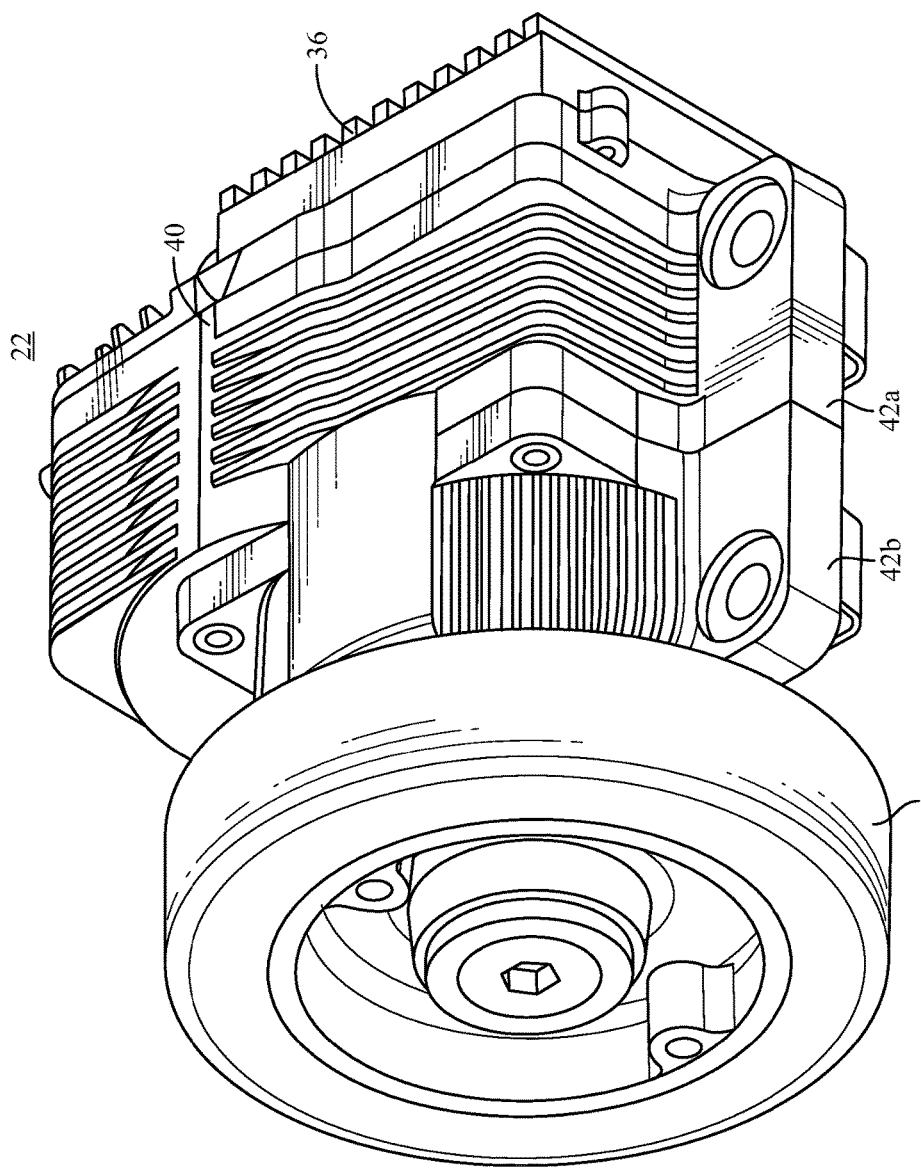
FIG. 4 is a second perspective view of a drive assembly of the embodiment of FIG. 1.
Figure 5:
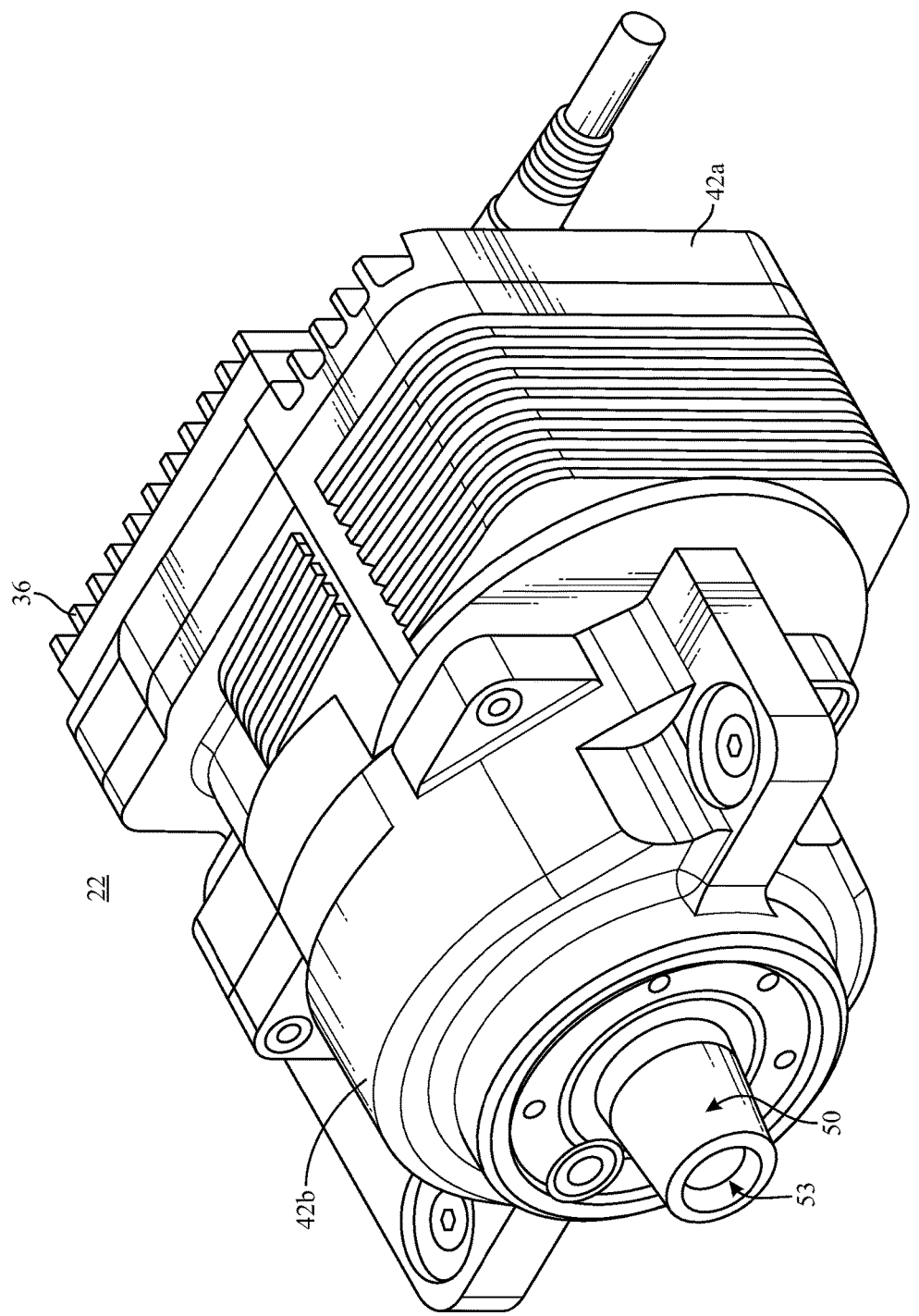
FIG. 5 is another perspective view of a drive assembly of the embodiment of FIG. 1 with the wheel removed for clarity.
Figure 6:
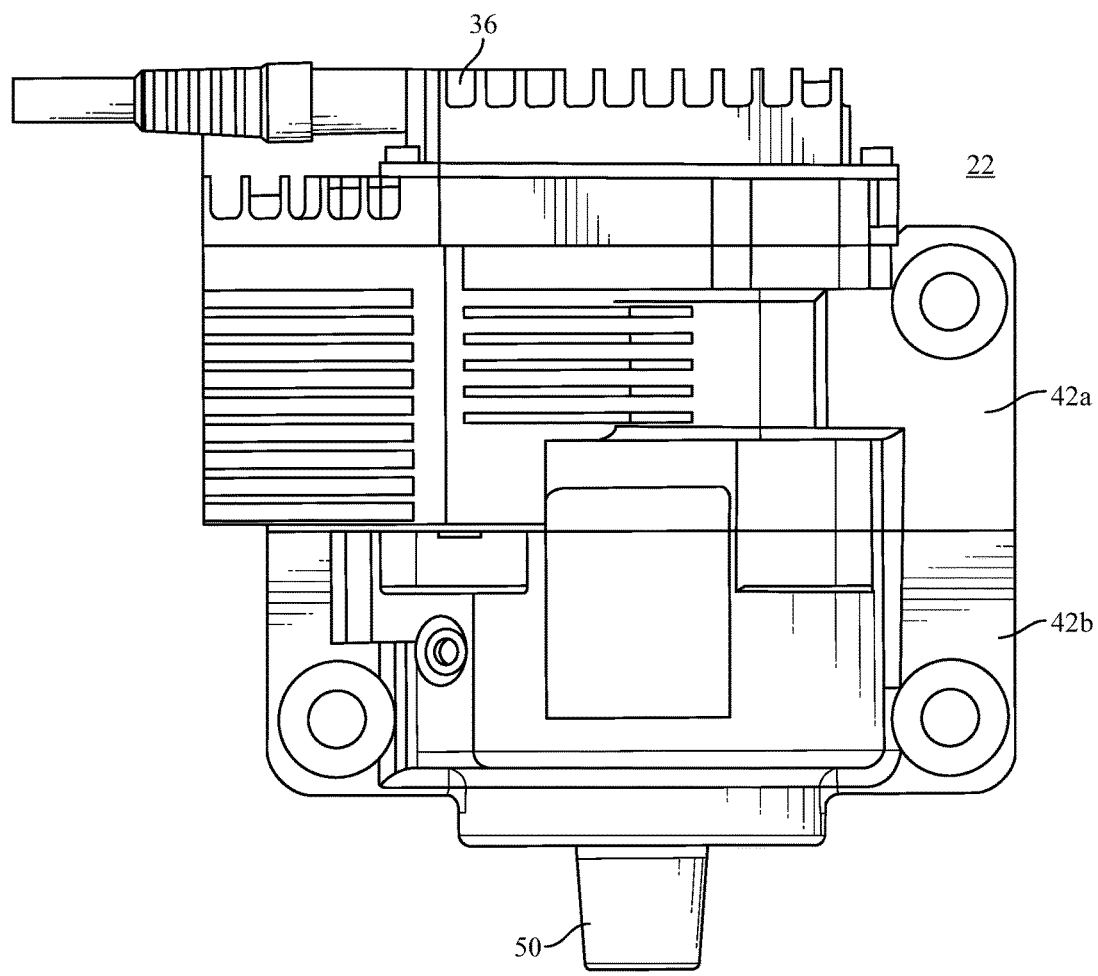
FIG. 6 is a top view of the drive assembly of FIG. 5.
Figure 7:
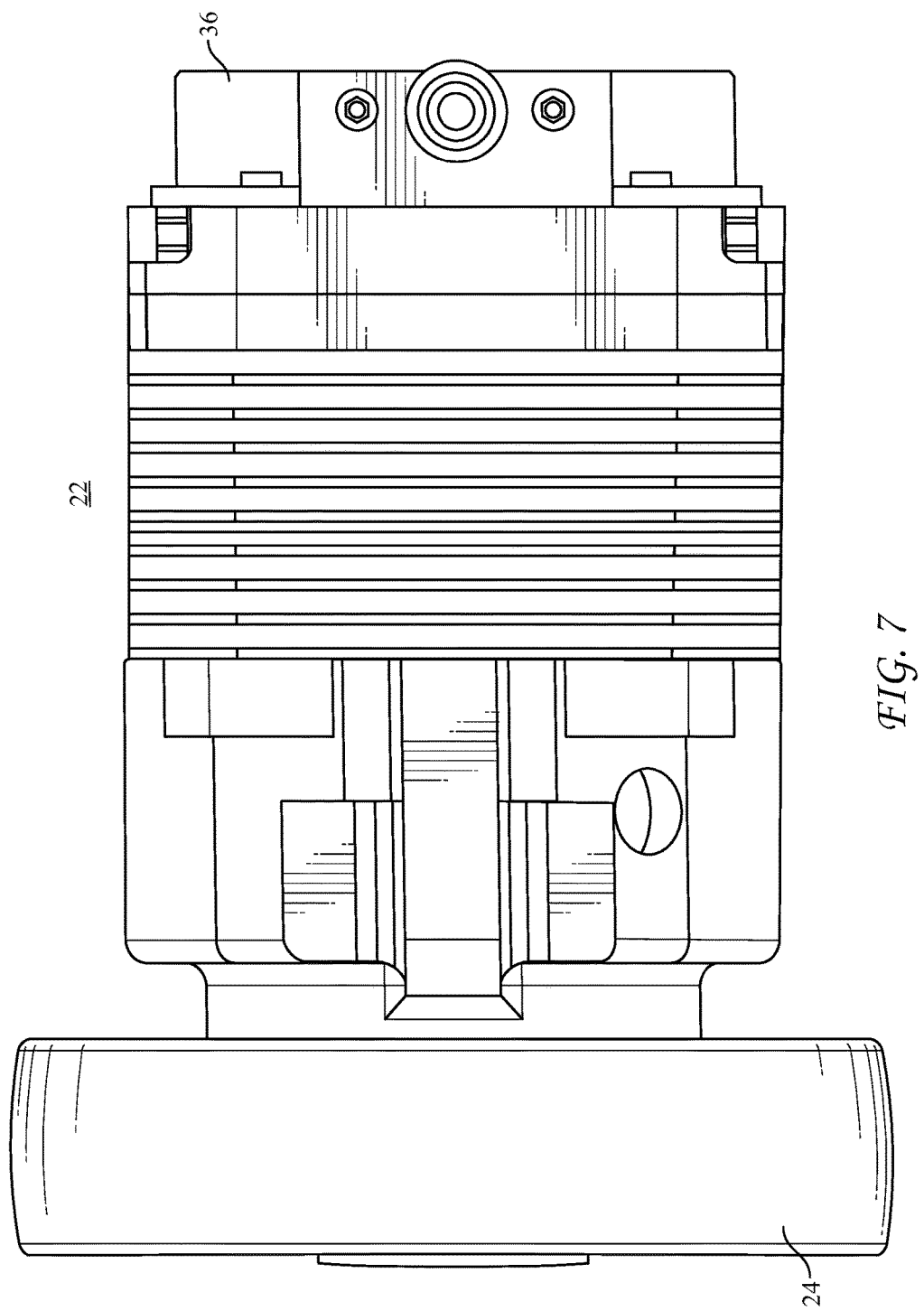
FIG. 7 is a side view of the drive assembly of FIG. 5.

Mobile drive unit 20 carries the docking system and includes left and right drive assemblies 22 (shown in FIG. 3 et seq.), left and right drive wheels 24, front and rear stabilizing wheels 26, a position sensing system such as position sensor 28, and batteries (not shown in the figures). Each drive wheel 24 is mechanically coupled to its corresponding drive assembly 22 and in this way drive wheels 24 are motorized. Position sensor 28 may include any type of sensor, as will be understood by persons familiar with position sensor technology for material handling robots.

Each one of the left and right drive assemblies 22 is enclosed in a corresponding housing 40 that includes a base 42a and a cover 42b. Only one drive assembly 22 is described below, as preferably the left drive and right drive are identical, but merely flipped in orientation. The present invention is not limited to left and right drives being identical, as the present invention encompasses a left drive that is different from the right drive. An electrical interface or controls interface 36 (preferably conventional) is mounted on the housing to operatively connect drive assembly 22 to controller 30.

Figure 9:
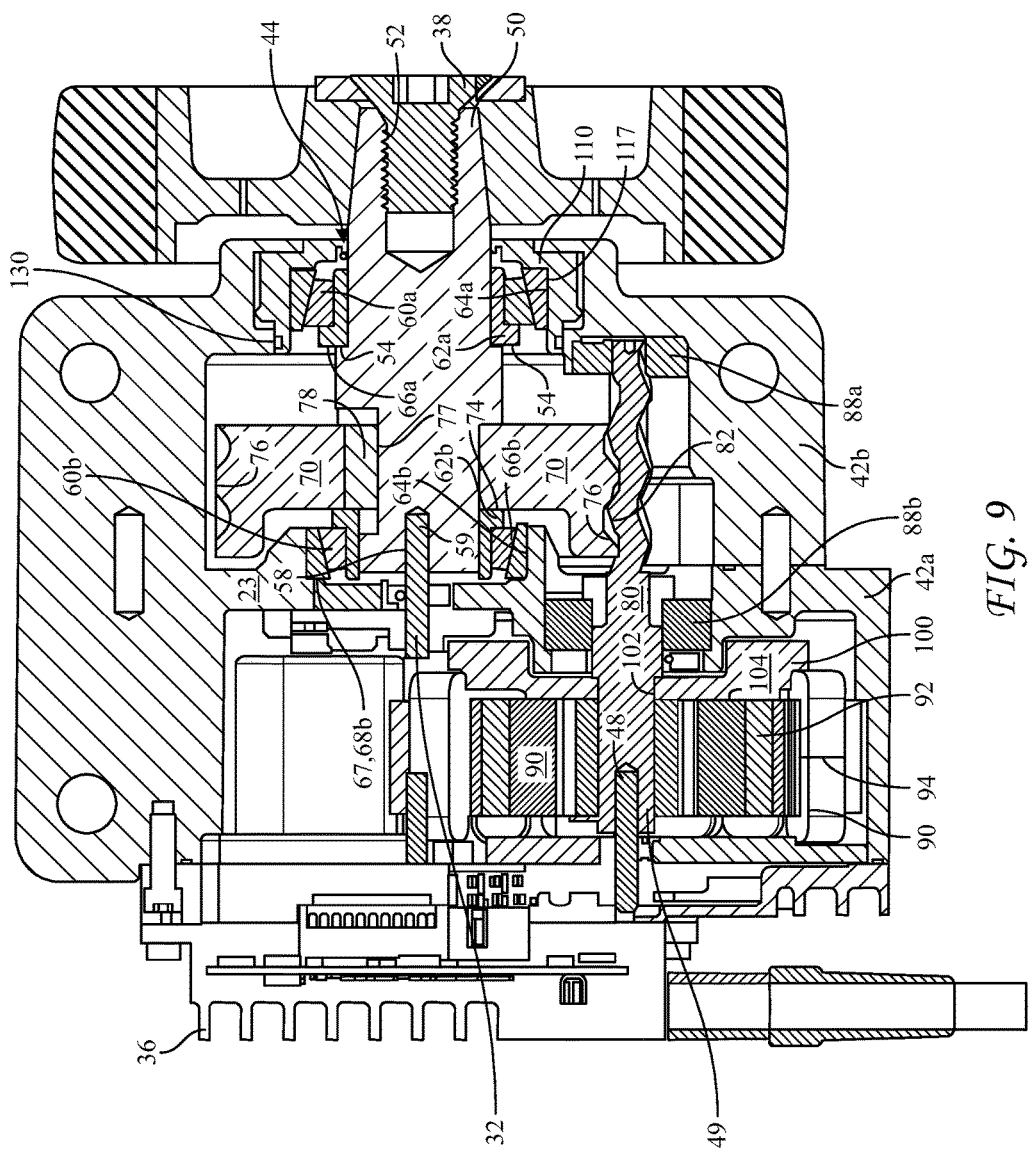
FIG. 9 is a cross section view of a drive assembly of FIG. 3.

As best shown in cross sectional FIG. 9, drive 22 includes an output shaft 50 that extends through an opening 44 in the sidewall of cover 42b, a single pass gear set 23, a motor 90, a flywheel 100, and a compression ring or compression plug 110. In operation, motor 90 provides torque to output shaft 50 via the gear set 23. Compression plug 110 engages output shaft 50, as explained more fully below, and interfaces with evenly spaced scallops 46 on the exterior face uniformly around opening 44 of cover 42b, as explained more fully below. Scallops 46 are segments of a circle that are machined or cast into the exterior face of the housing.

A portion of output shaft 50 that is external to housing 40 provides an axle to which wheel 24 is mounted. A threaded recess 52 in the end face of output shaft 50 receives a wheel bolt 38 that affixes wheel 24 to output shaft 50. The gear set 23, which preferably is a single pass gear set, of drive 22 includes a helical output gear 70 mounted to (for example, by a key as described below) or, optionally, formed integrally with output shaft 50 (for example, the output gear 70 and output shaft 50 may be formed of a single casting, machined from a single block, or formed by other conventional methods), a helical pinion 80 engaged with output gear 70, and a motor 90 that is coupled to or formed integrally with pinion 80. Preferably, output gear 70 is located at or near an end of output shaft 50 opposite wheel 24.

A portion of output shaft 50 that is within housing 40 is (preferably) supported by a front tapered roller bearing 60a and a rear tapered roller bearing 60b. Tapered roller bearings are preferable for drive unit 20 for their ability to carry large radial loads, among other advantages. Bearings 60a, 60b include a cone 62a,b, a cup 64a,b, and corresponding tapered rollers. At a machined surface 77, which preferably is between bearings 60a and 60b, helical gear 70 is mounted to output shaft 50. Gear 70, as illustrated in the figures, is coupled to output shaft 50 by a key 78 installed in keyways in shaft 50 and gear 70.

Figure 10:
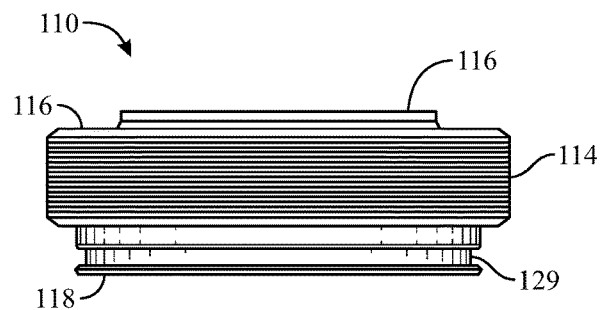
FIG. 10 is a side view of a compression plug used in the embodiment of FIG. 3.
Figure 11:
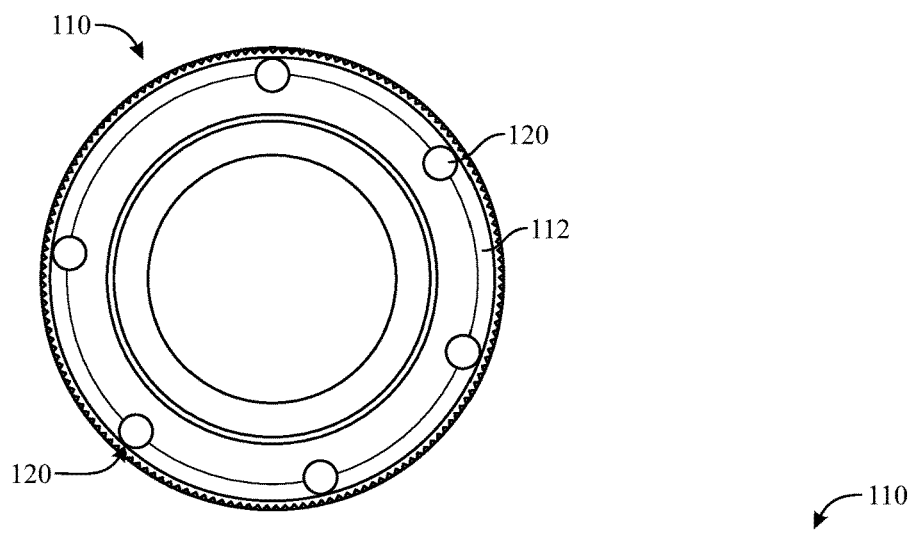
FIG. 11 is an end view of the compression plug of FIG. 8.
Figure 12:
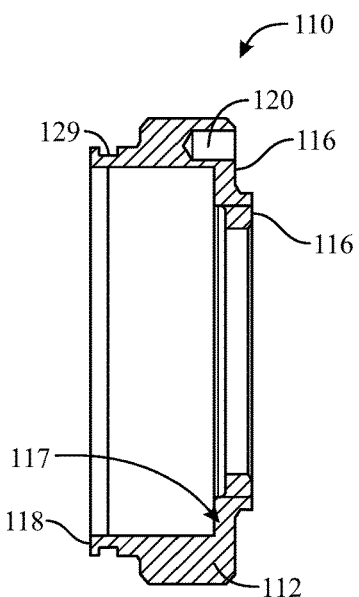
FIG. 12 is a cross sectional view of the compression plug of FIG. 8.

Compression plug 110, as best shown in FIGS. 10 through 12, includes a body 112 having external threads 114, an external flange face 116 having a rearward facing surface 117, an internal flange face 118, and threaded holes 120 that are not equidistantly spaced apart. Compression plug 110 is threaded into a threaded opening 44 in the cover 42b. Plug 110 also includes a peripheral groove 129 for holding a seal 130 (FIG. 9), which seals output shaft 50.

Output shaft 50 includes a forward-facing front shoulder 54 that is in contact with cone 62a of the front bearing 60a. Rear bearing cup 64b is in contact with a contact surface 67 of the housing 40. Thus, when compression plug 110 is tightened by torqueing plug 110 into the corresponding housing opening 44, plug internal flange face 117 urges against the outboard face 68a of front bearing cup 64a, which force is transmitted through bearing 60a such that an inboard face 66a of cone 62a urges against output shaft shoulder 54. Further, the force applied by the tightening of plug 110 is transmitted from shoulder 54 through output shaft 50 and through gear 70 such that a rear or backside face 74 of gear 70 urges against an inboard face 66b of cone 62b. The force is transmitted through bearing 60b such that an outboard face 68b of cup 64b urges against a machined reference surface 67 in housing 40. Thus, bearings 60a and 60b may be preloaded by compression plug 110, and a desired torque may be applied to plug 110 to achieve the desired preload, such as to "set" the bearings for minimizing axial clearance and like benefits. As is understood by persons familiar with drive technology, too little preload can lead to premature radial play in the bearing set 23 which would harm the operation of the gear set 23. Too much preload detracts from the design load capability of the bearing set 23, which might reduce the life of the bearing set (compared to properly chosen preload). The desired preload force on the tapered roller bearings may be determined by conventional techniques, which will be understood by persons familiar with tapered bearing technology.

Figure 8:
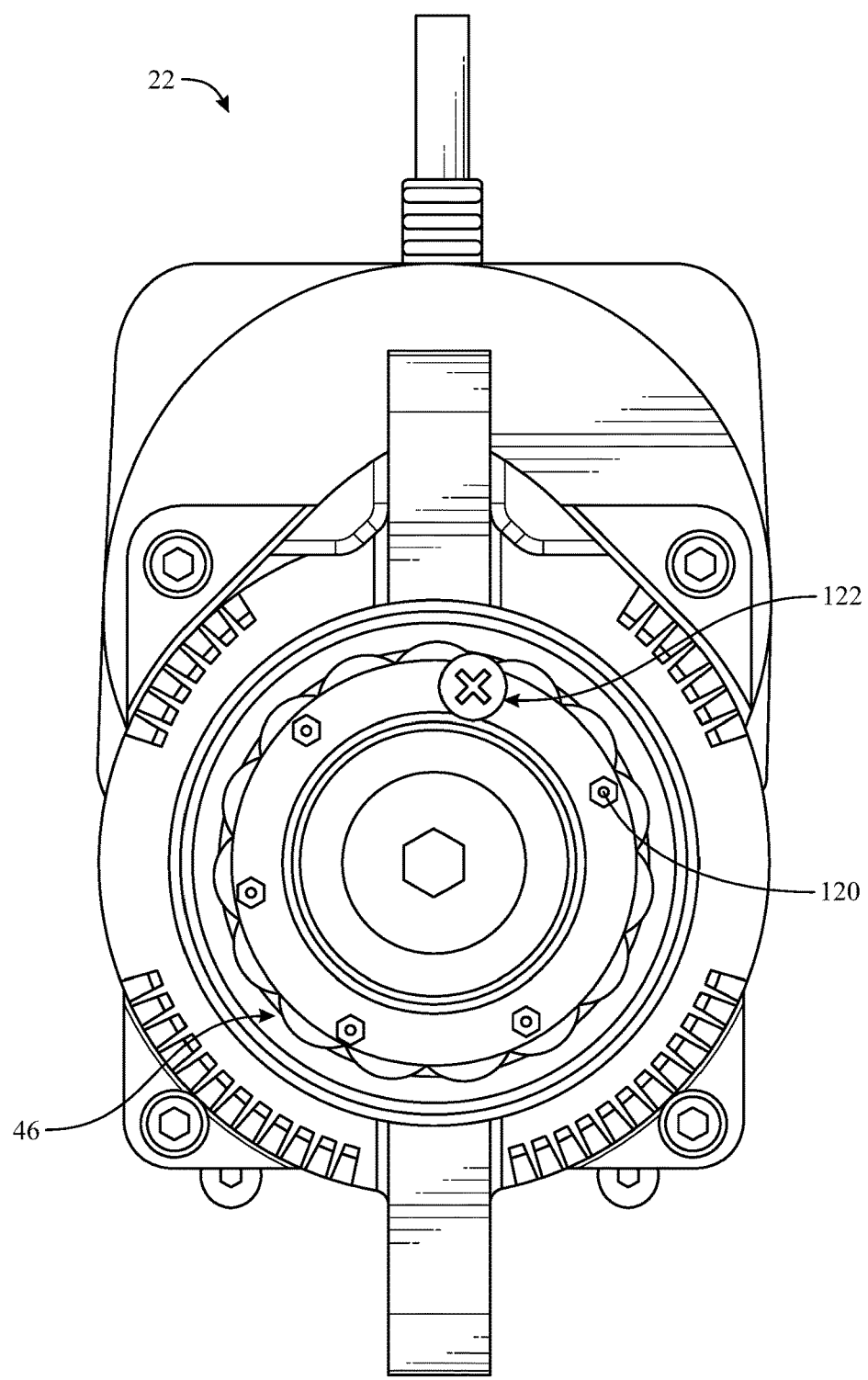
FIG. 8 is an end view of the drive assembly of FIG. 5.

In the embodiment shown in the figures, spacing of bolt holes 120 in plug flange face 116 is not uniform, as best shown in FIG. 11, which enables plug 110 to be affixed in the appropriate position after the desired torque is applied to plug 110 by a single bolt or screw. Preferably, most of the spacings of bolt holes 129 have an arc distance that is different from that of each other one of the bolt hole spacing. In the embodiment shown in the figures, every one of the bolt hole spacings has an arc length that is different from each other one of the spacings. In this regard, one of the holes 120 may be chosen that best aligns with a scallop 46. A portion of a screw head 122 (FIG. 8) inserted into the hole 120 is thus partially located in the fixed scallop 46 such that scallop 46 mechanically prevents plug 110 from loosening or backing out of threaded engagement with the housing. In other words, a side face the scallop 46 contacts a side face of the bolt disposed therein if the plug upon the screw beginning to rotate and thus loosen, and in that regard inhibits or stops plug 110 from loosening. In the embodiment shown, only one bolt 120 is required to inhibit or stop plug 110 from loosening. Any other conventional means to retain plug 110 in its desired rotational position, such as pins, keys, and the like, may be employed.

Gear 70 has a recess 58 in its rear face for receiving a dowel 59 that is part of an output shaft encoder 32. Gear 70 has helical teeth 76 that mate with helical teeth 82 of pinion 80. Preferably, pinion 80 is a shaft that extends into motor 90 and thus includes a recess 48 in its rear face for a dowel 49 that is part of a motor encoder 34. Pinion 80 is supported by a front pinion bearing 88a and a rear pinion bearing 88b that are mounted within housing 40. As illustrated, pinion 80 is cantilevered from the bearing such that a motor portion 84 of the pinion is coupled to a motor rotor 92. A motor stator 94 is formed in housing 40 about rotor 92.

The axes of pinion 80 and output gear 70 are oriented in parallel and preferably an involute profile as taught in U.S. Pat. No. 3,247,736, entitled "Involute gear combinations." In this regard gear teeth 76 and 82 have helix angle is given by $$-0.35z_v+1.4<(b/m_n)\sin\beta_o<1.5$$

wherein $\beta_o$=helix angle at the pitch cylinder, $m_n$=module, b=minimum tooth width and $z_v$=virtual number of teeth.

Pinion teeth 82 have a small addendum and a large useful dedendum (that is, the difference between useful height of tooth and addendum) the profiles of teeth 76 and 82 are complementary in respect of the tooth sides involved in power transmission. Further, there is a positive profile deviation for the pinion, and the pressure angle is between 15 degrees and 25 degrees. In the embodiment shown, the gear ratio is 18:1. In the embodiment shown, gear 70 has 54 teeth 76 and pinion 80 has three teeth 82. In the embodiment shown, the overall envelope dimensions, bolt pattern, and symmetry are specified by an automated storage and retrieval system (ASRS) operator.

The inventors have determined that improved power density and rated sustainable wheel load density of drive 22 is such that the rotating assembly within drive 22 may have insufficient inertia for proper or optimum operation of driving and sensing electronics and overall system function. Accordingly, drive 22 includes a flywheel 100 that preferably is coupled to pinion shaft 80, as best shown in FIG. 9, at flywheel inner surface 102. The body 104 of the flywheel 100 is configured such that (preferably) flywheel 100 a moment of inertia that is at least 0.008 kg*m^2 and no more than 0.500 kg*m^2, preferably at least 0.012 kg*m^2 and no more than 0.400 kg*m^2, and more preferably at least 0.013 kg*m^2 and no more than 0.250 kg*m^2. The AGV's drive 22 has a preferred rated sustainable radial load on each wheel of at least 800 pounds (365 kg) and no more than 2,000 pounds (910 kg). The design rated sustainable radial load on each wheel in the embodiment shown is 1,000 pounds (455 kg) (that is, 1,000 pounds per side or 2,000 pounds total).

Drive assembly 22 provides sufficient power density and greatly improved rated sustainable wheel load density, which is a property measured by the sustained wheel load radial rating (that is, the maximum continuous radial load placed on the wheels from the weight of vehicle 10 and inventory or other loads) divided by the weight of the drive assembly 22. Drive assembly 22 preferably has a rated sustainable wheel load density of at least 250 N/KG, more preferably at least 350 N/KG, and more preferably at least 450 N/KG. For comparison, the prior art drive assembly described in U.S. Pat. No. 8,280,546 has a rated sustainable wheel load density of 220.5 N/KG. In the embodiment shown in the figures, rated sustainable wheel load density is 497.8 N/KG, an improvement of approximately 225%.

Controller 30 receives input from sensors, such as holder sensor 18, position sensor 28, motor encoder information from encoders 32 and 34, and electrical properties, such as battery charge information, motor voltage and current, and the like. Controller 30 typically includes a processor, and may also be in wireless communication with an inventory system controller, such as that described in U.S. Pat. No. 8,280,546. Accordingly, controller 30 regulates power to each of the left and right drive assemblies 22. Aspects of the present invention have been illustrated with reference to a material handling robot. The present invention is not limited to the particular illustration herein, but rather among other things is intended to cover variations and combinations that would be understood by persons familiar with robot technology. For merely one example, a material handling robot has been used to illustrate aspects of the present invention, and the invention is intended to encompass other types of mechanisms and autonomous guided vehicles. Further, the present invention is not limited to the particular structures or components explained in the specification unless expressly stated in the claims.

The invention claimed is:

1. In an autonomous guided vehicle having at least left and right drive assemblies adapted for mounting to left and right drive wheels, each one of the drive assemblies comprising:
   a housing;
   an output shaft extending through a sidewall of the housing, coupled to the wheel, and adapted for imparting torque to the wheel;
   a single pass gear set having a helical gear coupled to the output shaft and a helical pinion engaged with the helical gear;
   a motor rotor coupled to the pinion;
   a motor stator fixed in the housing;
   a flywheel coupled to the gear set;
   an encoder coupled to one of the motor rotor, pinion, and output shaft;
   a front tapered roller bearing located within the housing and supporting the output shaft, the front tapered roller bearing having a cone in contact with a front contact surface of the output shaft;
   a rear tapered roller bearing having a cone in contact with an internal contact surface of the housing and a cup in contact with a rear contact surface formed on at least one of the output shaft and the gear set; and
   a compression plug that, upon tightening, contacts a cup of the front tapered roller bearing to preload the front tapered roller bearing against the output shaft front contact surface,
   wherein the compression plug, upon tightening, is configured to further preload the rear tapered hearing against the housing internal contact surface; and
   wherein the motor rotor, the motor stator, the flywheel, and the gear set are within the housing.

2. The autonomous guided vehicle of claim 1 wherein the autonomous guided vehicle is a material handling robot.

3. The autonomous guided vehicle of claim 1 wherein each one of the drive assemblies is symmetric about a horizontal centerline.

4. The autonomous guided vehicle of claim 1 wherein the left drive assembly is identical to the right drive assembly, the left drive assembly is oriented 180 degrees from the right drive assembly about an axis perpendicular to a center axis of the output shafts.

5. The autonomous guided vehicle of claim 1 wherein the moment of inertia of the flywheel is at least 0.008 kg*m^2 and no more than 0.500 kg*m^2.

6. The autonomous guided vehicle of claim 1 wherein the moment of inertia of the flywheel is at least 0.012 kg*m^2 and no more than 0.400 kg*m^2.

7. The autonomous guided vehicle of claim 1 wherein the moment of inertia of the flywheel is at least 0.013 kg*m^2 and no more than 0.250 kg*m^2.

8. The autonomous guided vehicle of claim 1 wherein the rated sustainable wheel load density, measured by the sustaining wheel load radial rating divided by the weight of the drive assembly is at least 250 N/KG.

9. The autonomous guided vehicle of claim 8 wherein the rated sustainable wheel load density is at least 350 N/KG.

10. The autonomous guided vehicle of claim 8 wherein the rated sustainable wheel load density is at least 450 N/KG.

11. The autonomous guided vehicle of claim 1 wherein the vehicle is adapted for moving at least 1.5 miles per hour and no more than about 6 miles per hour.

12. The autonomous guided vehicle of claim 1 wherein the vehicle is adapted for moving at least 3.0 miles per hour and no more than 4.0 miles per hour.

13. The autonomous guided vehicle of claim 1 wherein the wheel is 4 inches to 8 inches in diameter.

14. The autonomous guided vehicle of claim 1 wherein the wheel is mounted on the output shaft and the rated sustainable radial load on each wheel is at least 800 pounds (365 kg) and no more than 2,000 pounds (900 kg).

15. A drive assembly for an autonomous guided vehicle, the drive assembly comprising:
    a housing,
    a motor,
    an output shaft operatively coupled to the motor and extending through the housing;
    a single pass gear set operatively coupled to the output shaft;
    a pair of tapered roller bearings located within the housing and supporting the output shaft, a front one of the pair of tapered roller bearings having a cone in contact with a front contact surface of the output shaft, a rear one of the pair of tapered roller bearings having a cone in contact with an internal contact surface of the housing and a cup in contact with a rear contact surface formed on at least one of the output shaft and the gear set;
    a compression plug that, upon tightening, contacts a cup of the front bearing to preload the front bearing against the output shaft front contact surface and to preload the rear bearing against the housing internal contact surface.

16. The drive assembly of claim 15 wherein the front contact surface of the output shaft is a shoulder formed on the output shaft.

17. The drive assembly of claim 15 wherein the gear set consists essentially of a helical gear coupled to the output shaft and a helical pinion engaged with the helical gear, and wherein the rear contact surface is at least partially formed by a portion of a side face of the helical gear.

18. The drive assembly of claim 15 wherein the compression plug is adapted for installation within a specified torque range to achieve a desired preloading force of the front bearing and the rear bearing.

19. The drive assembly of claim 18 wherein the compression plug is a ring that is prevented from rotation by a bolt in a scallop.

* * * * *